United States Patent
Willems

(10) Patent No.: US 9,415,655 B2
(45) Date of Patent: Aug. 16, 2016

(54) ROTARY DAMPER

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/638,800

(22) Filed: Mar. 4, 2015

(65) Prior Publication Data
US 2015/0251513 A1 Sep. 10, 2015

(30) Foreign Application Priority Data
Mar. 5, 2014 (DE) .......................... 10 2014 003 222

(51) Int. Cl.
| | |
|---|---|
| *F16F 15/03* | (2006.01) |
| *B60G 15/02* | (2006.01) |
| *B60G 11/18* | (2006.01) |
| *B60G 13/02* | (2006.01) |
| *F16F 1/14* | (2006.01) |

(52) U.S. Cl.
CPC ................ *B60G 15/02* (2013.01); *B60G 11/18* (2013.01); *B60G 13/02* (2013.01); *F16F 1/14* (2013.01); *F16F 15/03* (2013.01); *B60G 2202/13* (2013.01); *B60G 2202/22* (2013.01); *B60G 2202/30* (2013.01); *B60G 2204/128* (2013.01); *B60G 2206/41* (2013.01)

(58) Field of Classification Search
CPC ....... F16F 9/145; F16F 15/03; F16F 15/1337; F16F 15/18; F16F 2232/02; B60G 11/18; B60G 11/189; B60G 2202/22; B60G 2202/13
USPC ....................................................... 188/267
See application file for complete search history.

(56) References Cited

U.S. PATENT DOCUMENTS

| | | | | |
|---|---|---|---|---|
| 4,825,720 A | * | 5/1989 | Capdepuy | ............. F16H 49/001 74/468 |
| 2003/0102193 A1 | * | 6/2003 | Edmondson | ......... B60G 13/001 188/267 |
| 2008/0157448 A1 | | 7/2008 | Preukschat | |
| 2011/0025001 A1 | * | 2/2011 | Kajino | ............... B60G 17/0157 280/5.515 |
| 2013/0049508 A1 | | 2/2013 | Willems | |
| 2013/0154277 A1 | | 6/2013 | Willems | |

(Continued)

FOREIGN PATENT DOCUMENTS

| | | |
|---|---|---|
| DE | 38 31 338 | 4/1998 |
| DE | 10 2006 061 985 | 7/2008 |
| DE | 10 2011 078 838 | 1/2012 |

(Continued)

*Primary Examiner* — Nicholas J Lane
(74) *Attorney, Agent, or Firm* — Henry M. Feiereisen LLC.

(57) ABSTRACT

A rotary damper includes an electromagnetic damper motor, a damper housing surrounding the damper motor and configured as tubular torsion spring secured by a fastening element to a first mass. A lever is swingably mounted relative to the fastening element and connected to a second mass. The torsion spring is connected with one end to the fastening element and with another end to the lever. A gear mechanism formed as strain wave gearing transmits and/or modifies a relative rotational movement between the first and second masses to the damper motor for vibration damping. The strain wave gearing includes a rigid unit having internal teeth, a flexible unit having external teeth, and an oval wave generator rotatably mounted in the flexible unit and causing a deformation of the flexible unit, when rotating, with the rigid and flexible units coupled to one another by a formfit via the internal and external teeth.

11 Claims, 2 Drawing Sheets

(56) References Cited

U.S. PATENT DOCUMENTS

| | | |
|---|---|---|
| 2013/0154404 A1 | 6/2013 | Willems |
| 2013/0320791 A1 | 12/2013 | Willems |
| 2014/0217663 A1 | 8/2014 | Willems |
| 2014/0300072 A1 | 10/2014 | Willems |
| 2014/0360825 A1 | 12/2014 | Willems |

FOREIGN PATENT DOCUMENTS

| | | |
|---|---|---|
| DE | 10 2011 101 350 | 11/2012 |
| DE | 10 2011 101 701 | 11/2012 |
| DE | 10 2011 102 743 | 11/2012 |
| EP | 1 354 731 | 4/2008 |
| EP | 1 935 679 | 6/2008 |

* cited by examiner

ROTARY DAMPER

CROSS-REFERENCES TO RELATED APPLICATIONS

This application claims the priority of German Patent Application, Serial No. 10 2014 003 222.1, filed Mar. 5, 2014, pursuant to 35 U.S.C. 119(a)-(d), the disclosure of which is incorporated herein by reference in its entirety as if fully set forth herein.

BACKGROUND OF THE INVENTION

The present invention relates to a rotary damper.

The following discussion of related art is provided to assist the reader in understanding the advantages of the invention, and is not to be construed as an admission that this related art is prior art to this invention.

US 2008/0157448 describes a wheel suspension for a motor vehicle, having a transverse control arm that can be attached to a vehicle body by way of bearings and can be rotated about a longitudinal axis, and a body spring configured as a torsion bar spring for absorbing rotational movements of the transverse control arm about the longitudinal axis. The body spring is disposed on the transverse control arm so as to rotate with it, with a first end. An electromechanical actuator for changing the angle of rotation of the body spring is disposed at a second end of the body spring. The wheel suspension has a damping element. The second end of the body spring is connected with a stress relief spring that is configured as a torsion bar spring, disposed coaxially with the body spring, and can be attached to the vehicle body. Thus, the provision of two different springs is required, each configured as torsion bar spring, thereby increasing the demand for space for the wheel suspension and the accommodated damping device.

It would be desirable and advantageous to provide an improved rotary damper to obviate prior art shortcomings.

SUMMARY OF THE INVENTION

According to one aspect of the present invention, a rotary damper includes an electromagnetic damper motor, a damper housing in surrounding relationship to the damper motor, the damper housing being configured as tubular torsion spring which has a first end and a second end in opposition to the first end, a fastening element configured to secure the damper housing to a first mass, a lever swingably mounted in relation to the fastening element and connected to a second mass, with the first end of the torsion spring being connected to the fastening element and the second end of the torsion spring being connected to the lever, and a gear mechanism configured in the form of a strain wave gearing to transmit and/or modify a relative rotational movement between the first and second masses to the damper motor for vibration damping, the strain wave gearing including a rigid unit having internal teeth, a flexible unit having external teeth, and an oval wave generator rotatably mounted in the flexible unit and configured to cause a deformation of the flexible unit, when rotating, with the rigid and flexible units being coupled to one another by a formfit via the internal and external teeth.

The provision of the strain wave gearing is especially advantageous when combined with the damper housing in the form of a torsion spring because the presence of a high translation between the flexible unit and the rigid unit of the strain wave gearing results in a pivoting movement between the rigid and flexible units that is sufficient to provide an adequate rotation movement of a rotor in relation to a stator of the damper motor.

A rotary damper according to the present invention thus includes a sufficiently dimensioned damper spring which requires little installation space and easy to install.

According to another advantageous feature of the present invention, the damper housing can be made from a special steel tube or a plastic tube. Special steel or high-grade steel and plastic can be produced with an elasticity sufficient to cushion the transfer of the pivoting movement between the lever and the fastening element. Advantageously, the plastic tube may be made of carbon fiber reinforced plastic or glass fiber reinforced plastic. As a result, the damper housing exhibits not only the required spring characteristic but has also an advantageous stability.

According to another advantageous feature of the present invention, a helical spring can be embedded in the plastic tube. By integrating the helical spring in the plastic beforehand, the spring force of the combined structure can best suited to the situation at hand.

According to another advantageous feature of the present invention, a bearing part can be fixed to the damper housing, and the damper motor can include a rotor which is rotatably mounted in the damper housing in coaxial relationship thereto, a stator which is secured to the bearing part, and a structure provided on the rotor and the stator for generating a magnetic field. An electromagnetic damper motor is especially suitable to enable a coaxial assembly with the damper housing in the form of a torsion spring because the damper motor is arranged in coaxial relationship to the damper housing and can be designed in a space-saving manner.

According to another advantageous feature of the present invention, the stator can have a coil assembly to which current is applicable, and the rotor can have a magnet assembly.

According to another advantageous feature of the present invention, a flexible roller bearing can be arranged between the rigid unit and the wave generator. Advantageously, the rigid unit can be connected with the lever and the wave generator can be connected to the rotor of the damper motor.

According to another advantageous feature of the present invention, an elastomer piece can be arranged in the lever. Advantageously, the elastomer piece is sized to extend across the lever. The provision of the elastomer piece eliminates introduction of roadway excitations of high frequency into the rotary damper because the elastomer piece forms a rotationally acting damping support.

According to another advantageous feature of the present invention, the elastomer piece can be sized to extend into the rigid unit. As a result, introduction of high-frequency vibrations into the rotary damper is further attenuated since the elastomer piece is effective in a same way in both the lever and between the lever and the rigid unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
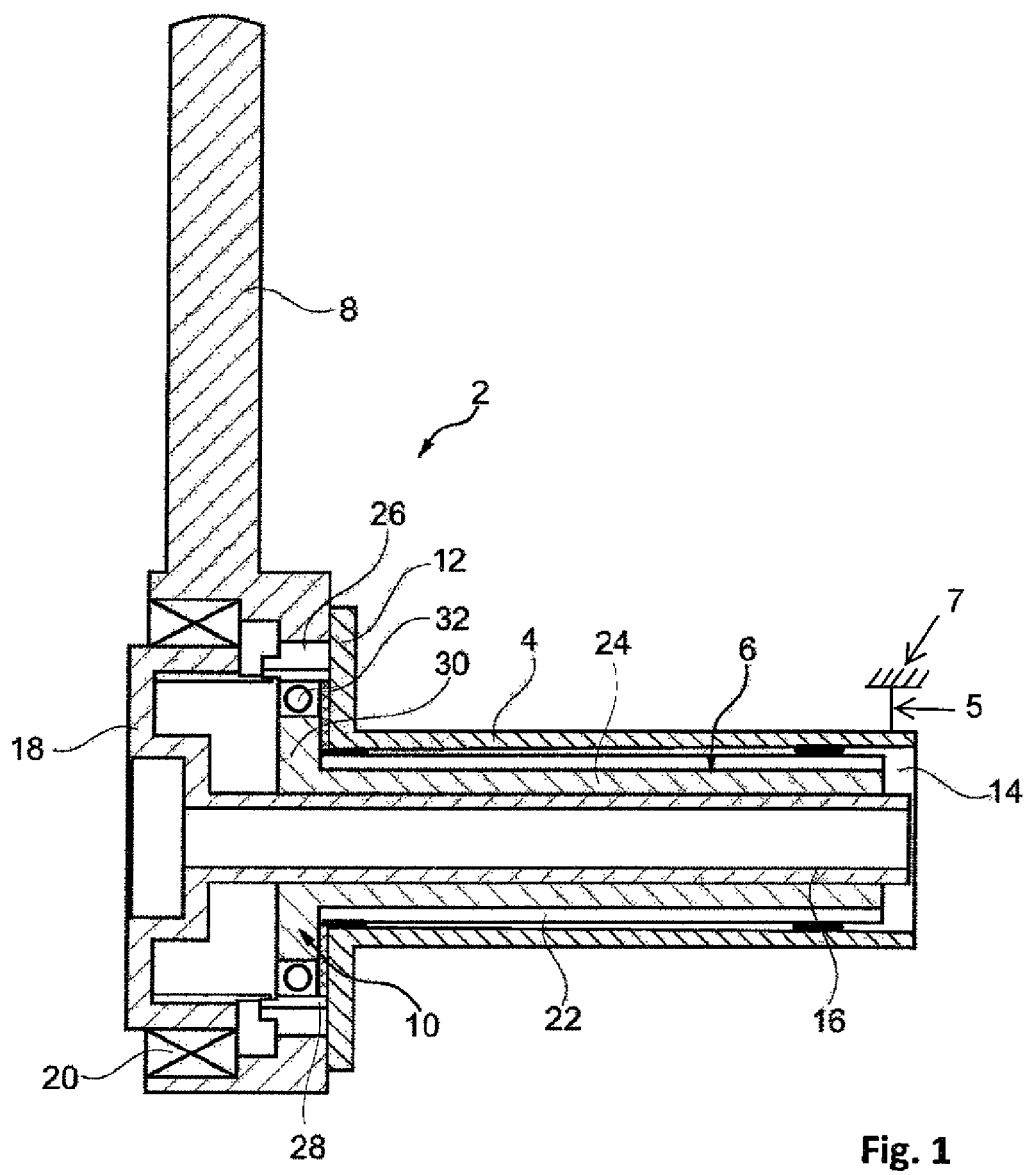
FIG. 1 is a sectional view of a first embodiment of a rotary damper according to the present invention, taken along a plane in longitudinal direction of a damper housing.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a first embodiment of a rotary damper according to the present invention, generally designated by reference numeral 2. The rotary damper 2 includes an electromagnetic damper housing 4 which is disposed in surrounding relation to a damper motor 6 and is secured to a first mass 7 via a fastening element 5. A lever 8 is swingably mounted in relation to the fastening element 5 and connected to a second mass. The rotary damper 2 further includes a gear mechanism configured as a strain wave gearing 10 for transmitting and/or change a relative driving movement between the masses on the damper motor 6 for vibration damping.

The damper housing 4 of the rotary damper 2 of FIG. 1 is configured in the form of a torsion spring and is made from a special steel tube or plastic tube. The plastic tube can be made of carbon fiber reinforced fiber plastic or glass fiber reinforced plastic to reinforce the damper housing 4. As an alternative, it is also possible to embed a helical spring (not shown) in the plastic tube.

The damper housing 4 has one end provided with a wall 12, which extends radially relative to the axis of the damper housing 4, for connection with the lever 8. A connecting piece 14 is provided on the other end of the damper housing 4 for connection of the damper housing 4 with a bearing part 16 arranged coaxially in the damper housing 4. The bearing part 16 has a flange 18 which is connected with the lever 8 via a roller bearing 20.

The electromagnetic damper motor 4 includes a rotor 22 and a stator 24 as well as means for generation of a magnetic field on the rotor 22 and the stator 24. The rotor 22 is rotatably mounted on the bearing part 16 in coaxial relation to the damper housing 4, whereas the stator 24 is securely fixed between the rotor 22 and the damper housing 4. The rotor 22 can be provided with a magnet assembly, while the stator 24 can include a coil assembly to which current can be applied. This is common in damper motors of this type.

The gear mechanism 10 in the form of a strain wave gearing includes a rigid unit 26 having internal teeth, a flexible unit 28 having external teeth, and an oval wave generator 30 which is rotatably mounted in the flexible unit 28. Rotation of the wave generator 30 causes a deformation of the flexible unit 28, with both units 26, 27 being coupled with one another in a form-fitting manner via the teeth. A flexible roller bearing 32 is arranged between the flexible unit 28 and the wave generator 30.

The rigid unit 26 is connected with the lever 8 and the radial wall 12 of the damper housing 4, whereas the wave generator 30 is connected with the rotor 22 of the damper motor.

In accordance with one embodiment, the damper housing 4 can be connected with the vehicle body via the connecting piece 14. The lever 8 is articulated on the other end of the damper housing 4 and drives the rotary damper 2. the rotary damper 2 is also mounted to the vehicle body via the bearing part 16 and the flange 18.

As the wheel moves up and down, both the rotary damper 2 and the damper housing 4 rotate about an angle $\phi$. As a result of the rotation about the angle $\phi$, the damper housing 4 generates a rebounding force. Due to the rotation speed, the rotation damper 2 generates a damping force.

Figure 2:
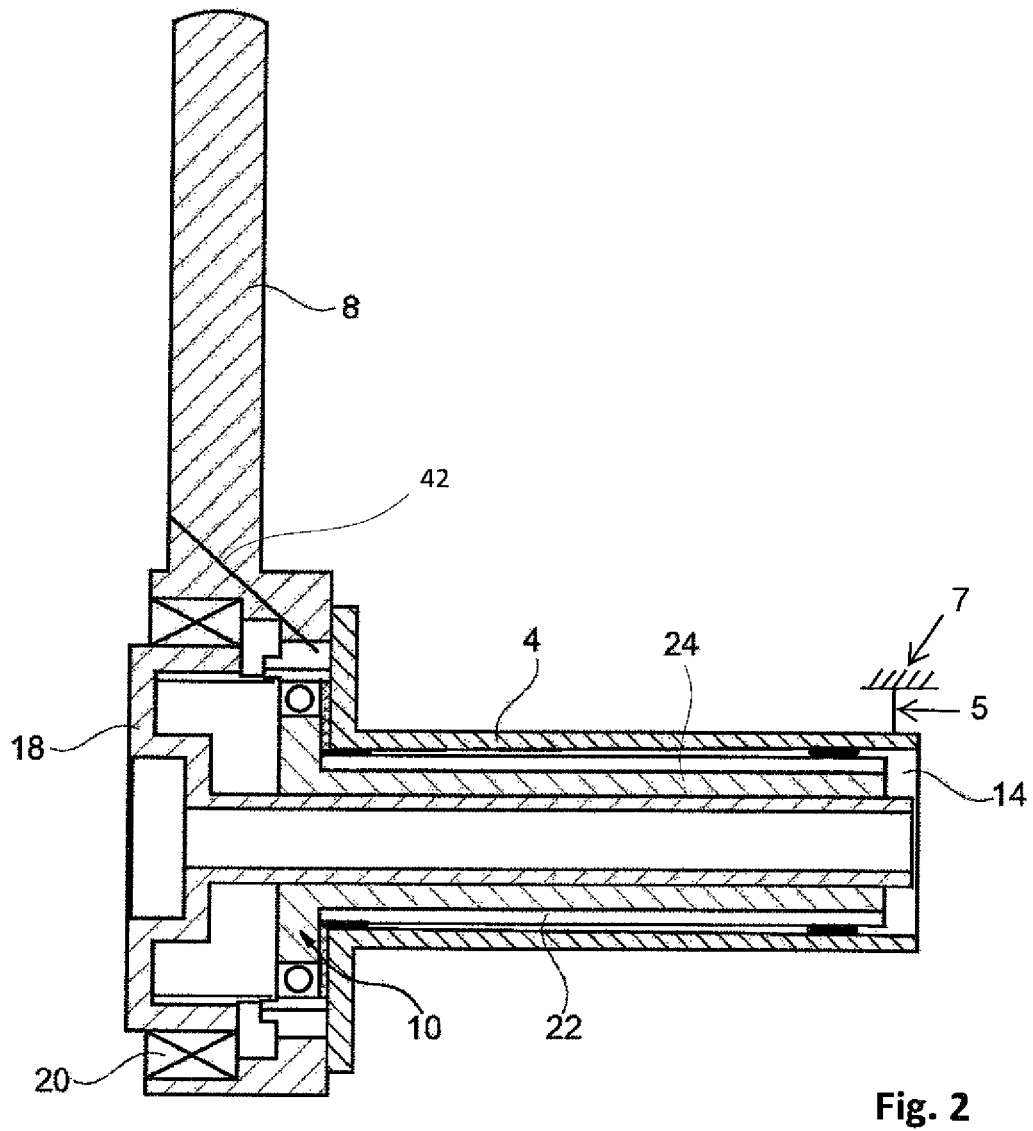
FIG. 2 is a sectional view of a second embodiment of a rotary damper according to the present invention, taken along a plane in longitudinal direction of a damper housing.

FIG. 2 shows a sectional view of a second embodiment of a rotary damper according to the present invention, generally designated by reference numeral 2a. Parts corresponding with those in FIG. 1 are denoted by identical reference numerals and not explained again. The description below will center on the differences between the embodiments. In this embodiment, provision is made for an elastomer piece 42 which is arranged in the lever 8. The elastomer piece 42 runs across the lever 8, as shown in FIG. 2, and extends hereby through the lever 8 and into the rigid unit 26 of the strain wave gearing 10. The elastomer piece 42 provides damping of high-frequency vibrations that may be transmitted from roadway influences upon the rotary damper 2a.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rotary damper, comprising:
    an electromagnetic damper motor;
    a damper housing in surrounding relationship to the damper motor, said damper housing being configured as tubular torsion spring which has a first end and a second end in opposition to the first end;
    a fastening element configured to secure the damper housing to a first mass;
    a lever swingably mounted in relation to the fastening element and connected to a second mass, with the first end of the torsion spring being connected to the fastening element and the second end of the torsion spring being connected to the lever; and
    a gear mechanism configured in the form of a strain wave gearing to transmit and/or modify a relative rotational movement between the first and second masses to the damper motor for vibration damping, said strain wave gearing including a rigid unit having internal teeth, a flexible unit having external teeth, and an oval wave generator rotatably mounted in the flexible unit and configured to cause a deformation of the flexible unit, when rotating, with the rigid and flexible units being coupled to one another by a formfit via the internal and external teeth.

2. The rotary damper of claim 1, wherein the damper housing is made from a steel tube or a plastic tube.

3. The rotary damper of claim 2, wherein the plastic tube is made of carbon fiber reinforced plastic or glass fiber reinforced plastic.

4. The rotary damper of claim 2, further comprising a helical spring embedded in the plastic tube.

5. The rotary damper of claim 1, further comprising a bearing part fixed to the damper housing, said damper motor including a rotor rotatably mounted in the damper housing in coaxial relationship thereto, a stator secured to the bearing part, and a structure provided on the rotor and the stator for generating a magnetic field.

6. The rotary damper of claim 5, wherein the structure includes a coil assembly of the stator to which coil assembly current is applicable, and a magnet assembly of the rotor.

7. The rotary damper of claim 1, further comprising a flexible roller bearing arranged between the rigid unit and the wave generator.

8. The rotary damper of claim 1, wherein the rigid unit is connected with the lever and the wave generator is connected to the rotor of the damper motor.

9. The rotary damper of claim 1, further comprising an elastomer piece arranged in the lever.

10. The rotary damper of claim 9, wherein the elastomer piece is sized to extend across the lever.

11. The rotary damper of claim 9, wherein the elastomer piece is sized to extend into the rigid unit.

\* \* \* \* \*